(12) United States Patent
Ghoshal et al.

(10) Patent No.: US 10,021,240 B1
(45) Date of Patent: Jul. 10, 2018

(54) SYSTEM AND METHOD OF MOBILE PHONE CUSTOMIZATION BASED ON UNIVERSAL MANIFEST WITH FEATURE OVERRIDE

(71) Applicant: Sprint Communications Company L.P., Overland Park, KS (US)

(72) Inventors: Jagannath Ghoshal, Olathe, KS (US); Dale S. Schempp, Lenexa, KS (US); Kristin B. Wear, Overland Park, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 9 days.

(21) Appl. No.: 15/268,347

(22) Filed: Sep. 16, 2016

(51) Int. Cl.
   *H04M 1/725* (2006.01)
   *H04B 1/3816* (2015.01)

(52) U.S. Cl.
   CPC ...... *H04M 1/72563* (2013.01); *H04B 1/3816* (2013.01)

(58) Field of Classification Search
   CPC ..... H04W 8/183; H04M 1/72563; H04Q 7/20
   See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 6,889,040 B1* | 5/2005 | Koo | H04W 28/18 370/466 |
| 7,027,773 B1 | 4/2006 | McMillin | |
| 7,165,191 B1 | 1/2007 | Vakrat | |

(Continued)

FOREIGN PATENT DOCUMENTS

| | | |
|---|---|---|
| DE | 112016000711 T5 | 11/2017 |
| EP | 2079256 A1 | 7/2009 |

(Continued)

OTHER PUBLICATIONS

FAIPP Pre-Interview Communication dated Mar. 12, 2015, U.S. Appl. No. 13/972,827, filed Aug. 21, 2013.

(Continued)

*Primary Examiner* — Myron K Wyche

(57) ABSTRACT

A user equipment (UE). The UE comprises a radio transceiver, a processor, a non-transitory memory, and a customization client application stored in the non-transitory memory. When executed by the processor, the customization client determines a group identity (GID) of the UE, reads a customization manifest received by the UE via the radio transceiver, wherein the manifest identifies a plurality of feature customization policies and a plurality of user feature customization override policies, each feature customization policy defines feature customizations that are to be active for the UE, each override policy defines which feature customizations are to be applied mandatorily notwithstanding preexisting user customizations, selects one of the plurality of feature customization policies and one of the override policies from the customization manifest based on the GID of the UE, and customizes the UE according to the selected feature customization policy and the selected override policy.

20 Claims, 10 Drawing Sheets

(56) References Cited

U.S. PATENT DOCUMENTS

| | | |
|---|---|---|
| 7,260,382 B1 | 8/2007 | Lamb et al. |
| 7,266,371 B1 | 9/2007 | Amin et al. |
| 7,409,208 B1 | 8/2008 | Clare et al. |
| 7,493,111 B2 | 2/2009 | Knowles |
| 7,530,079 B2 | 5/2009 | Stubbs et al. |
| 7,817,988 B2 | 10/2010 | Kruis et al. |
| 7,904,895 B1 | 3/2011 | Cassapakis et al. |
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,522,343 B2 | 8/2013 | Hernacki |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,124,719 B2 | 9/2015 | Inlow et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,304,668 B2 | 4/2016 | Rezende et al. |
| 9,307,400 B1 | 4/2016 | Blinn et al. |
| 9,313,643 B1 | 4/2016 | Ghoshal et al. |
| 9,319,270 B2 | 4/2016 | Bestmann et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 9,532,211 B1 | 12/2016 | Sumner |
| 9,549,009 B1 | 1/2017 | Annan et al. |
| 9,603,009 B1 | 3/2017 | Indurkar |
| 9,681,251 B1 | 6/2017 | Ahn et al. |
| 9,743,271 B2 | 8/2017 | Urbanek |
| 9,794,727 B1 | 10/2017 | Delker et al. |
| 9,913,132 B1 | 3/2018 | Ghoshal et al. |
| 2002/0091931 A1 | 7/2002 | Quick, Jr. et al. |
| 2002/0142783 A1 | 10/2002 | Yoldi et al. |
| 2003/0023514 A1 | 1/2003 | Adler et al. |
| 2003/0031235 A1 | 2/2003 | Kim et al. |
| 2003/0188160 A1 | 10/2003 | Sunder et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0254975 A1 | 12/2004 | Teh et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0114114 A1 | 5/2005 | Rudolph |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2005/0203703 A1 | 9/2005 | Chang |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0242150 A1 | 10/2006 | Jogand-Coulomb et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0043667 A1 | 2/2007 | Qawami et al. |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0192854 A1 | 8/2007 | Kelley et al. |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0022395 A1 | 1/2008 | Holtzman et al. |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0051076 A1 | 2/2008 | OShaughnessy et al. |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0188210 A1 | 8/2008 | Choi et al. |
| 2008/0225806 A1 | 9/2008 | Arian et al. |
| 2008/0281511 A1 | 11/2008 | Miyata |
| 2008/0298559 A1 | 12/2008 | Nanjundaswamy |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0217385 A1 | 8/2009 | Teow et al. |
| 2009/0239518 A1 | 9/2009 | Feuillette |
| 2009/0247124 A1 | 10/2009 | de Atley et al. |
| 2009/0259974 A1 | 10/2009 | Lin |

(56) References Cited

U.S. PATENT DOCUMENTS

| | | |
|---|---|---|
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0138652 A1 | 6/2010 | Sela et al. |
| 2010/0159876 A1 | 6/2010 | Brown et al. |
| 2010/0159954 A1 | 6/2010 | Rahman et al. |
| 2010/0161724 A1 | 6/2010 | Sathyan et al. |
| 2010/0161928 A1 | 6/2010 | Sela et al. |
| 2010/0167696 A1 | 7/2010 | Smith et al. |
| 2010/0185434 A1 | 7/2010 | Burvall et al. |
| 2010/0190479 A1 | 7/2010 | Scott et al. |
| 2010/0192120 A1 | 7/2010 | Raleigh |
| 2010/0194632 A1 | 8/2010 | Raento et al. |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0250368 A1 | 9/2010 | Porco |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0086611 A1 | 4/2011 | Klein et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202233 A1 | 8/2011 | Hatton |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054022 A1 | 3/2012 | Kosashvili |
| 2012/0077546 A1 | 3/2012 | Kawa et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0151199 A1 | 6/2012 | Shriver |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2012/0309377 A1 | 12/2012 | De Atley et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0031541 A1 | 1/2013 | Wilks et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0124186 A1 | 5/2013 | Donabedian et al. |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Bias, Jr. |
| 2013/0275560 A1 | 10/2013 | Bestmann et al. |
| 2013/0281085 A1 | 10/2013 | Sen et al. |
| 2013/0295902 A1 | 11/2013 | Justen et al. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2013/0326359 A1 | 12/2013 | Beckert et al. |
| 2014/0024332 A1 | 1/2014 | Droste et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0033291 A1 | 1/2015 | Nicolau |
| 2015/0040246 A1 | 2/2015 | Yuen et al. |
| 2015/0071268 A1 | 3/2015 | Kennedy et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0220245 A1 | 8/2015 | Wojcik et al. |
| 2015/0242336 A1 | 8/2015 | Loreskar et al. |
| 2015/0271662 A1 | 9/2015 | Lhamon et al. |
| 2015/0304506 A1 | 10/2015 | Zhu et al. |
| 2015/0312873 A1 | 10/2015 | Cormier et al. |
| 2015/0319178 A1 | 11/2015 | Desai et al. |
| 2015/0331590 A1 | 11/2015 | Yasui |
| 2015/0370428 A1 | 12/2015 | Chan et al. |
| 2016/0029204 A1 | 1/2016 | Lalwaney |
| 2016/0044091 A1 | 2/2016 | Doumet |
| 2016/0105843 A1 | 4/2016 | Xue et al. |
| 2016/0234675 A1 | 8/2016 | Ghoshal et al. |
| 2016/0239317 A1 | 8/2016 | Cuddihy et al. |
| 2016/0255493 A1* | 9/2016 | Lihosit .................. H04W 8/183 455/419 |
| 2017/0150435 A1 | 5/2017 | Tagg et al. |
| 2017/0295450 A1 | 10/2017 | Urbanek |

FOREIGN PATENT DOCUMENTS

| | | |
|---|---|---|
| EP | 2461613 A1 | 6/2012 |
| GB | 2292047 A | 2/1996 |

(56) References Cited

FOREIGN PATENT DOCUMENTS

| | | | |
|---|---|---|---|
| JP | 201285272 A | 4/2012 | |
| JP | 2015505190 A | 2/2015 | |
| JP | 5924347 B2 | 4/2016 | |
| JP | 6270066 B2 | 1/2018 | |
| JP | 6273585 B2 | 1/2018 | |
| JP | 6277455 B2 | 1/2018 | |
| KR | 2006039974 | 2/1996 | |
| WO | WO2010135257 A1 | 11/2010 | |
| WO | WO2012078753 A1 | 6/2012 | |
| WO | WO2013169983 A1 | 11/2013 | |
| WO | WO2014020237 A1 | 2/2014 | |
| WO | WO2014046814 A1 | 3/2014 | |
| WO | WO2014113128 A1 | 7/2014 | |
| WO | WO2014123758 A1 | 8/2014 | |
| WO | WO2014123759 A1 | 8/2014 | |
| WO | WO2014158430 A1 | 10/2014 | |
| WO | WO2015030945 A1 | 3/2015 | |
| WO | WO2015060965 A2 | 4/2015 | |
| WO | WO2016130266 A1 | 8/2016 | |

OTHER PUBLICATIONS

Notice of Allowance dated May 7, 2015, U.S. Appl. No. 13/972,827, filed Aug. 21, 2013.
FAIPP Pre-Interview Communication dated Feb. 25, 2016, U.S. Appl. No. 14/820,522, filed Aug. 6, 2015.
Notice of Allowance dated May 6, 2016, U.S. Appl. No. 14/820,522, filed Aug. 6, 2015.
FAIPP Pre-Interview Communication dated Nov. 20, 2014, U.S. Appl. No. 13/899,566, filed May 21, 2013.
Notice of Allowance dated Jan. 22, 2015, U.S. Appl. No. 13/899,566, filed May 21, 2013.
FAIPP Pre-Interview Communication dated Oct. 16, 2015, U.S. Appl. No. 14/060,712, filed Oct. 23, 2013.
Final Office Action dated Mar. 9, 2016, U.S. Appl. No. 14/060,712, filed Oct. 23, 2013.
Advisory Action dated May 3, 2016, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Final Office Action dated Feb. 24, 2016, U.S. Appl. No. 14/060,719, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
FAIPP Pre-Interview Communication dated Apr. 15, 2015, U.S. Appl. No. 14/085,474 (U.S. Appl. No. 14/060,712), filed Nov. 20, 2013.
Notice of Allowance dated May 29, 2015, U.S. Appl. No. 14/085,474, filed Nov. 20, 2013.
FAIPP Pre-Interview Communication dated Sep. 29, 2015, U.S. Appl. No. 14/163,035, filed Jan. 24, 2014.
Final Office Action dated Feb. 16, 2016, U.S. Appl. No. 14/163,035, filed Jan. 24, 2014.
Office Action dated May 10, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Final Office Action dated Jun. 14, 2016, U.S. Appl. No. 13/968,259, filed Aug. 15, 2013.
Notice of Allowance dated Aug. 18, 2016, U.S. Appl. No. 13/968,259, filed Aug. 15, 2013.
FAIPP Pre-Interview Communication dated Mar. 4, 2015, U.S. Appl. No. 14/010,518, filed Aug. 27, 2013.
Notice of Allowance dated May 8, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
Notice of Allowance dated Jul. 8, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
Notice of Allowance dated Jun. 26, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Aug. 20, 2015, U.S. Appl. No. 14/073,321, filed Nov. 6, 2013.
Notice of Allowance dated Nov. 4, 2015, U.S. Appl. No. 14/073,321, filed Nov. 6, 2013.
FAIPP Pre-Interview Communication dated Apr. 8, 2015, U.S. Appl. No. 14/157,507, filed Jan. 16, 2014.
First Action Interview Office Action dated Oct. 16, 2015, U.S. Appl. No. 14/157,507, filed Jan. 16, 2014.
Notice of Allowance dated Feb. 25, 2016, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
Notice of Allowance dated Jan. 27, 2016, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
First Action Interview Office Action dated Feb. 2, 2016, U.S. Appl. No. 14/297,429, filed Jun. 5, 2014.
Notice of Allowance dated Apr. 20, 2016, U.S. Appl. No. 14/297,429, filed Jun. 5, 2014.
FAIPP Pre-Interview Communication dated Jul. 15, 2015, U.S. Appl. No. 14/163,041, filed Jan. 24, 2014.
Final Office Action dated Jan. 12, 2016, U.S. Appl. No. 14/163,041, filed Jan. 24, 2014.
Notice of Allowance dated Apr. 13, 2016, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
First Action Interview Office Action dated Jan. 19, 2016, U.S. Appl. No. 14/231,718, filed Mar. 31, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Office Action dated Oct. 6, 2016, U.S. Appl. No. 14/231,718, filed Mar. 31, 2014.
FAIPP Pre-Interview Communication dated Jul. 8, 2015, U.S. Appl. No. 14/475,399, filed Sep. 2, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736, filed on Dec. 7, 2011.
Foreign Communication from a Related Counterpart—International Search Report and Written Opinion, dated Jul. 24, 2013, PCT/US13/40278, filed on May 9, 2013.

(56) References Cited

OTHER PUBLICATIONS

Foreign Communication from a Related Counterpart Application, "Preliminary Report on Patentability," dated Nov. 20, 2014, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication from a Related Counterpart—International Preliminary Report on Patentability, dated Apr. 2, 2015, PCT/US13/55023, filed on Aug. 15, 2013.
Foreign Communication from a Related Counterpart Application, International Search Report and Written Opinion dated Jan. 24, 2014, PCT/US13/68981, filed on Nov. 7, 2013.
Foreign Communication From a Related Counterpart Application, International Preliminary Report on Patentability dated Jul. 30, 2015, PCT/US13/68981, filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart Application, International Preliminary Report on Patentability dated Aug. 20, 2015, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart Application, International Preliminary Report on Patentability dated Aug. 20, 2015, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, International Preliminary Report on Patentability dated Sep. 24, 2015, PCT/US14/16650, filed on Feb. 16, 2014.
Foreign Communication from a Related Counterpart—International Search Report and Written Opinion, dated Dec. 17, 2014, PCT/US14/46773, filed on Jul. 16, 2014.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Dec. 30, 2014, PCT/US14/56778, filed on Sep. 22, 2014.
Foreign Communication from a Related Counterpart—International Search Report and Written Opinion, dated Apr. 4, 2016, PCT/US16/13272, filed on Jan. 13, 2016.
Amazon Kindle e-book reader, on public sale 2007, http://en.wikipedia.org/wiki/Amazon_Kindle. last accessed on Apr. 13, 2015.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, "Motorola FONE F3 Review," www.mobilegazette.com, Sep. 16, 2007.
Yota Devices, "Hands-on with the YotaPhone: the e-ink Android phone that nobody expected," New York Times, 2010.
Annan, Brandon C., et al., "Electronic Fixed Brand Labeling," filed Feb. 8, 2013, U.S. Appl. No. 13/763,443.
Indurkar, Dhananjay, "System and Method of Branding a Device Independent of Device Activation," filed Jan. 24, 2014, U.S. Appl. No. 14/163,035.
Sumner, Bret D., "Directing Server Connection Based on Location Identifier," filed Aug. 15, 2013, U.S. Appl. No. 13/968,259.
Ahn, Chul Jin, et al., "Customization for Preloaded Applications," filed Mar. 31, 2014, U.S. Appl. No. 14/231,718.
Koller, Gary D., et al., "Out of the Box Experience (OOBE) Country Choice Using Wi-Fi Layer Transmission," filed Oct. 31, 2014, U.S. Appl. No. 14/530,666.
Delker, Jason R., et al. "Network Access Tiered Based on Application Launcher Installation," filed May 25, 2016, U.S. Appl. No. 15/164,530.
Ghoshal, Jagannath, et al., "System and Method of Mobile Phone Customization Based on Universal Manifest," filed Sep. 14, 2016, U.S. Appl. No. 15/265,833.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
Foreign Office Action dated Jul. 7, 2015, Japanese Application Serial No. 2013-543310, filed Jul. 7, 2015.
Foreign Notice of Allowance dated Mar. 21, 2016, Japanese Application Serial No. 2013-543310, filed Jul. 7, 2015.
FAIPP Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
FAIPP Pre-Interview Communication dated Sep. 22, 2014, U.S. Appl. No. 13/468,028, filed May 9, 2012.
First Action Interview Office Action dated Mar. 16, 2015, U.S. Appl. No. 13/468,028, filed May 9, 2012.
Final Office Action dated Nov. 4, 2015, U.S. Appl. No. 13/468,028, filed May 9, 2012.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
FAIPP Pre-Interview Communication dated Jun. 2, 2015, U.S. Appl. No. 14/152,627, filed Jan. 10, 2013.
Notice of Allowance dated Aug. 6, 2015, U.S. Appl. No. 14/152,627, filed Jan. 10, 2013.
FAIPP Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
Office Action dated Mar. 2, 2015, U.S. Appl. No. 13/622,234, filed Sep. 18, 2012.
Notice of Allowance dated Jul. 15, 2015, U.S. Appl. No. 13/622,234, filed Sep. 18, 2012.
FAIPP Pre-Interview Communication dated Jan. 11, 2016, U.S. Appl. No. 14/877,215, filed Oct. 7, 2015.
Notice of Allowance dated Apr. 13, 2016, U.S. Appl. No. 14/877,215, filed Oct. 7, 2015.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Mar. 26, 2015, U.S. Appl. No. 14/522,586, filed Oct. 24, 2014.
Notice of Allowance dated Jul. 7, 2015, U.S. Appl. No. 14/522,586, filed Oct. 24, 2014.

(56) References Cited

OTHER PUBLICATIONS

FAIPP Pre-Interview Communication dated Jul. 16, 2014, U.S. Appl. No. 13/744,861, filed Jan. 18, 2013.
Notice of Allowance dated Nov. 20, 2014, U.S. Appl. No. 13/744,861, filed Jan. 18, 2013.
EP Search Report dated Jul. 7, 2016, European Application Serial No. 13871478.7 filed on Jan. 18, 2013.
FAIPP Pre-Interview Communication dated Apr. 8, 2015, U.S. Appl. No. 13/844,104, filed Mar. 15, 2013.
Notice of Allowance dated Jul. 16, 2015, U.S. Appl. No. 13/844,104, filed Mar. 15, 2013.
FAIPP Pre-Interview Communication dated Oct. 22, 2014, U.S. Appl. No. 13/763,428, filed Feb. 8, 2013.
Notice of Allowance dated Mar. 20, 2015, U.S. Appl. No. 13/763,428, filed Feb. 8, 2013.
EP Search Report dated May 17, 2016, European Application No. 14749499.1, filed on Feb. 8, 2013.
FAIPP Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Notice of Allowance dated Mar. 26, 2015, U.S. Appl. No. 13/763,434, filed Feb. 8, 2013.
EP Search Report dated Aug. 24, 2015, European Application Serial No. 14749462.9, filed on Feb. 8, 2013.
FAIPP Pre-Interview Communication dated Apr. 23, 2014, U.S. Appl. No. 13/763,443, filed Feb. 8, 2013.
First Action Interview Office Action dated Jun. 16, 2015, U.S. Appl. No. 13/763,443, filed Feb. 8, 2013.
Final Office Action dated Aug. 10, 2015, U.S. Appl. No. 13/763,443, filed Feb. 8, 2013.
Advisory Action dated Nov. 3, 2015, U.S. Appl. No. 13/763,443, filed Feb. 8, 2013.
Office Action dated May 3, 2016, U.S. Appl. No. 13/763,443, filed Feb. 8, 2013.
Notice of Allowance dated Sep. 12, 2016, U.S. Appl. No. 13/763,443, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
Office Action dated Jun. 16, 2015, U.S. Appl. No. 13/899,567, filed May 22, 2013.
Notice of Allowance dated Oct. 26, 2015, U.S. Appl. No. 13/899,567, filed May 22, 2013.
Japanese Final Office Action dated Aug. 23, 2017, JP Application Serial No. 2015-531933; filed on Feb. 16, 2015.
Japanese Office Action dated Sep. 6, 2017, Japanese Application Serial No. 2015-553721, filed on Jan. 18, 2013.
Examiners Answer dated Aug. 28, 2017, U.S. Appl. No. 14/060,719, filed Oct. 23, 2013.
Office Action dated Oct. 5, 2017, U.S. Appl. No. 14/530,666, filed Oct. 31, 2014.
FAIPP Pre-Interview Communication dated Sep. 6, 2017, U.S. Appl. No. 15/063,383, filed Mar. 7, 2016.
FAIPP Office Action dated Oct. 16, 2017, U.S. Appl. No. 15/063,383, filed Mar. 7, 2016.
Notice of Allowance dated Oct. 27, 2017, U.S. Appl. No. 15/265,833, filed Sep. 14, 2016.
Foreign Communication from a Related Counterpart—International Preliminary Report on Patentability, dated Aug. 24, 2017, PCT/US16/13272, filed on Jan. 13, 2016.
Japanese Office Action dated Apr. 13, 2017, JP Application Serial No. 2015-531933; filed on Feb. 16, 2015.
Notice of Allowance dated Apr. 17, 2017, U.S. Appl. No. 14/060,712, filed Oct. 23, 2013.
Final Office Action dated Jan. 26, 2017, U.S. Appl. No. 14/060,719, filed Oct. 23, 2013.
Advisory Action dated Mar. 24, 2017, U.S. Appl. No. 14/060,719, filed Oct. 23, 2013.
Notice of Allowance dated Feb. 21, 2017, U.S. Appl. No. 14/231,718, filed Mar. 31, 2014.
FAIPP Office Action dated Jan. 31, 2017, U.S. Appl. No. 14/530,666, filed Oct. 31, 2014.
FAIPP Pre-Interview Communication dated Apr. 10, 2017, U.S. Appl. No. 15/164,530, filed May 25, 2016.
EP Search Report dated Oct. 12, 2016, EP International Application No. 11847301.6, filed on Jun. 20, 2013.
Final Office Action dated Oct. 26, 2016, U.S. Appl. No. 13/468,028, filed May 9, 2012.
Office Action dated Dec. 29, 2016, U.S. Appl. No. 14/060,712, filed Oct. 23, 2013.
Notice of Allowance dated Nov. 2, 2016, U.S. Appl. No. 14/163,035, filed Jan. 24, 2014.
FAIPP Pre-Interview Communication dated Nov. 4, 2016, U.S. Appl. No. 14/530,666, filed Oct. 31, 2014.
Examiner's Answer dated Aug. 14, 2017, U.S. Appl. No. 13/468,028, filed May 9, 2012.
EP Notice of Intention to Grant dated May 26, 2017, European Application No. 14749499.1, filed on Feb. 8, 2013.
Final Office Action dated May 30, 2017, U.S. Appl. No. 14/530,666, filed Oct. 31, 2014.
Advisory Action dated Aug. 10, 2017, U.S. Appl. No. 14/530,666, filed Oct. 31, 2014.
Notice of Allowance dated Jun. 14, 2017, U.S. Appl. No. 15/164,530, filed May 25, 2016.
Office Action dated May 31, 2017, U.S. Appl. No. 15/265,833, filed Sep. 14, 2016.
Urbanek, Robert E., "Delivery of Branding Content and Customizations to a Mobile Communication Device," filed Jun. 26, 2017, U.S. Appl. No. 15/633,737.
Indurkar, Dhananjay, "Mobile Phone Differentiated Set-Up," filed May 1, 2017, U.S. Appl. No. 15/584,001.
Japanese Decision for Grant dated Jan. 9, 2018, Japanese Application Serial No. 2015-553721; filed on Jan. 18, 2013.
Japanese Decision for Grant dated Dec. 19, 2017, Japanese Application Serial No. 2015-556971; filed on Jun. 24, 2015.
Final Office Action dated Jan. 18, 2018, U.S. Appl. No. 15/063,383, filed Mar. 7, 2016.
Notice of Allowance dated Feb. 13, 2018, U.S. Appl. No. 14/530,666, filed Oct. 31, 2014.
Japanese Office Action dated Feb. 28, 2018, Japanese Application Serial No. 2015-556972; filed on Jun. 25, 2015.
Office Action dated Mar. 13, 2018, U.S. Appl. No. 15/584,001, filed May 1, 2017.

* cited by examiner

SYSTEM AND METHOD OF MOBILE PHONE CUSTOMIZATION BASED ON UNIVERSAL MANIFEST WITH FEATURE OVERRIDE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones, also known as user equipment (UEs) in some contexts, are a common item of consumer electronic gear. On average, users replace their UEs about every two years. To distinguish over competitors and to attract the interest of customers, original equipment manufacturers (OEMs) of UEs produce a wide variety of different models of UEs. UEs may differ by operating system that is installed on the UE. UEs may differ by display size. UEs may differ by a brand name associated with the UE. It is understood that different brands may promote or support different user visible functions or applications on the UE. UEs may differ by quality and features of an electronic camera built into the UE.

SUMMARY

In an embodiment, a method of customizing a user equipment (UE) is disclosed. The method comprises receiving by the UE a definition of a group identity (GID) of the UE that comprises a UE model identity and a wireless communication service brand identity and receiving by the UE a customization manifest, where the customization manifest identifies a plurality of feature customization policies and a plurality of user feature customization override policies, where each feature customization policy defines which of a predefined number of feature customizations are to be active for a UE, and each user feature customization override policy defines which of the predefined number of feature customizations are to mandatorily be applied notwithstanding preexisting user customizations of the associated feature, whereby the customization manifest defines different feature customization policies to be applied to different UE models and for different wireless communication service brand identities and one of overrides or permits retaining preexisting user customizations of features. The method further comprises searching in the customization manifest by a customization client application executing on the UE using the GID of the UE as a search key, where the customization client application is triggered to execute by one of a UE activation process, a UE rebranding process, or a UE change of service provider, finding and selecting a feature customization policy in the customization manifest that matches the GID of the UE by the customization client application, and reading the selected feature customization policy from the customization manifest by the customization client application. The method further comprises finding and selecting a user feature customization override policy from the customization manifest that matches the GID of the UE by the customization client application, reading the selected user feature customization override policy from the customization manifest by the customization client application, identifying preexisting user feature customizations on the UE by the customization client application, and based on reading the selected feature customization policy, based on reading the selected user feature customization override policy, and based on identifying preexisting user feature customizations on the UE, customizing one or more features of the UE by the customization client application and not customizing one or more features of the UE that is identified for customization in the selected feature customization policy for which a preexisting user customization is identified and for which the selected user feature customization override policy allows retaining a preexisting user customization, where the customizing takes place as part of one of a UE activation process, a UE rebranding process, or a UE change of service provider.

In another embodiment, a user equipment (UE) is disclosed. The UE comprises a radio transceiver, a processor, a non-transitory memory, and a customization client application stored in the non-transitory memory. When executed by the processor, the customization client application determines a group identity (GID) of the UE during activation of the UE that comprises a UE model identity and a wireless communication service brand identity, identifies preexisting user feature customizations on the UE, and reads a customization manifest received by the UE via the radio transceiver, wherein the customization manifest identifies a plurality of feature customization policies and a plurality of user feature customization override policies, where each feature customization policy defines which of a predefined number of feature customizations are to be active for a UE, and each user feature customization override policy defines which of the predefined number of feature customizations are to mandatorily be applied notwithstanding preexisting user customizations of the associated feature. When executed, the customization client application further selects at least one of the plurality of feature customization policies from the customization manifest based on the GID of the UE, selects a feature customization override policy from the customization manifest based on the GID of the UE, and customizes the UE during one of activation of the UE, rebranding of the UE, or changing a provisioning of the UE to a different wireless communication service provider based on the selected at least one feature customization policies, the selected feature customization override policy, and based on identified preexisting user feature customizations on the UE, whereby some of the predefined number of feature customizations are customized in accordance with the customization manifest and some of the predefined number of feature customizations are not customized leaving corresponding preexisting user customizations in place based on the selected feature customization override policy allowing retaining the user customization.

In yet another embodiment, a user equipment (UE) is disclosed. The UE comprises a radio transceiver, a processor, a non-transitory memory, and a customization client application stored in the non-transitory memory. When executed by the processor in response to one of an activation of the UE, a rebranding of the UE, or a provisioning of the UE to a different service provider, the customization client application determines a group identity (GID) of the UE that comprises a UE model identity and a wireless communication service brand identity and reads a customization manifest received by the UE via the radio transceiver, wherein the customization manifest comprises a plurality of feature customization policies, a plurality of user feature customization override policies, a plurality of feature configuration policies, and a compressed file comprising a plurality of feature customization inputs where each feature customization policy defines which of a predefined number of feature customizations are to be active for a UE, each user feature customization override policy defines which of the predefined number of feature customizations are to mandatorily be applied notwithstanding preexisting user customizations of the associated feature, each feature configuration policy defines which of optional feature configurations of the predefined number of feature customizations is to be configured on the UE, and the feature customization inputs of the compressed file support activation of feature customization on UEs. The customization client application further identifies preexisting user feature customizations on the UE, selects at least one of the plurality of feature customization policies from the customization manifest based on the GID of the UE, selects a user feature customization override policy from the customization manifest based on the GID of the UE, selects at least one of the plurality of feature configuration policies from the customization manifest based on the GID of the UE, and uncompresses the file of feature customization inputs. The customization client application further customizes the UE by customizing at least one feature identified as active based on the uncompressed feature customization inputs, leaves at least one preexisting user feature customization in place for which the selected user feature customization override policy allows retaining the preexisting user feature customization, and configures at least one of the customization features identified as active based on the selected at least one of the feature configuration policies based on the uncompressed feature customization inputs.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
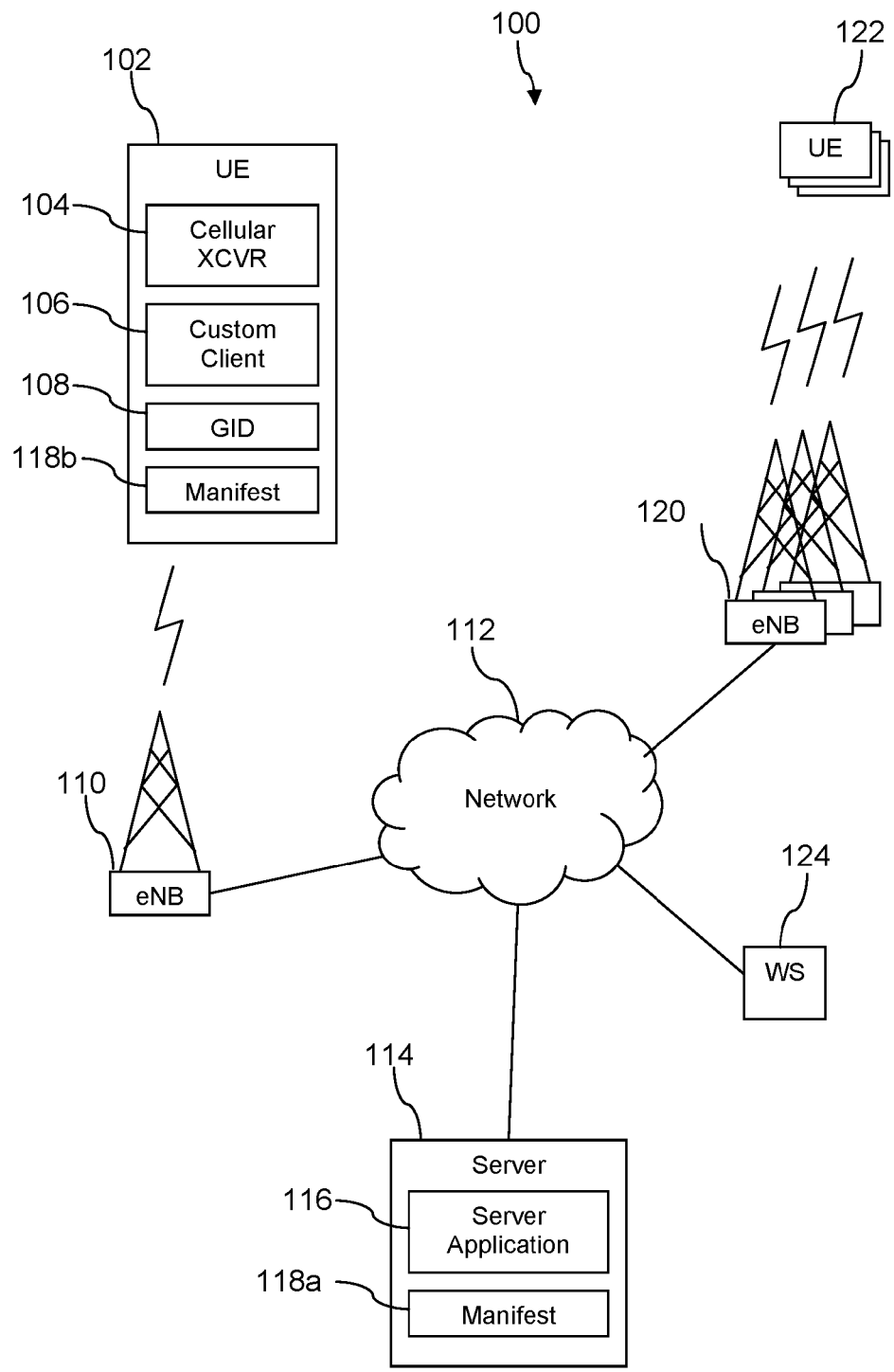
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A wireless telecommunication service provider may support a large number of different models of mobile phone or user equipment (UE) for use by its subscribers in its wireless network. In the United States, the current business paradigm is that a service provider may subsidize at least a part of the cost of a UE in exchange for a subscription contract with the subscriber, for example a two year contract. A different UE is associated with a different stock keeping unit (SKU) identity. Each different SKU entails separate and different testing which entails costs. It is desirable to buy a limited number of different SKU UEs from original equipment manufacturers and increase diversity of features and brands post-manufacturing, whereby the number of different SKUs can be reduced and the costs associated with testing the different SKUs is likewise reduced. The UEs may be shipped as quasi-generic UEs and customized later to different brands and different feature installations and different service plans after the OEMs ship the devices to the service provider.

As used herein, 'customization,' as performed by the customization framework and customization client described below, is a process that is controlled not by a user or subscriber but instead is controlled by a wireless communication service provider and by system-level applications (e.g., by a customization client application described further hereinafter) on the UE that are inaccessible to the user or subscriber. Additionally, 'customization,' as used herein, comprises in part configuring basic functionality associated with the UE such as brand specific logos, brand specific ring tones, brand specific customer care speed dial numbers or buttons, brand specific voice mail box configuration. Some configuration performed during this 'customization', as used herein, changes memory partitions that are restricted from user modifications by an operating system of the UE. In an embodiment, 'customization' can comprise, for example during an initial activation, configuring a phone number into the UE, configuring a mobile network code (MNC) into the UE, and other configuration actions that are preconditions for establishing ordinary wireless communication links with a radio access network (RAN), e.g., a cellular network.

The 'customization' described herein takes place in the context of specific and delimited duration processes mediated by the wireless service provider and/or the wireless network infrastructure core, for example pursuant and/or during initial activation of the UE, reactivation of the UE, rebranding of the UE, and/or provisioning the UE to a different wireless service provider. Said in other words, 'customization', as used herein occurs in a special operation mode and not during normal operation mode of the UE. The term 'customization', as used herein, does not refer to personalization of the UE by a user or subscriber, for example installing custom ringtones, selecting ringtone preferences by a user, setting a lock screen or 'swipe' screen image file for the UE, setting a background image file for the UE. The term 'user customization' or 'user feature customization' may be used herein to refer to customizations that a user may perform. In some cases, the features that a 'user customization' affects may be the same features that 'customization' accomplished by the customization framework and/or customization client affects. The two terms 'customization' and 'user customization' (or 'user feature customization') are used to distinguish customizations performed by the customization framework and/or customization client without user intervention and during special operation modes of the UE (i.e., during activation or reactivation or rebranding of the UE) from customizations performed by a user or subscriber (i.e., with user intervention) during normal operation modes of the UE.

The present disclosure teaches a universal framework for customizing UEs after shipping by OEMs. This new system and method frees the customization process from the open mobile alliance device management (OMA-DM) framework which has been used in the past for limited customization activities. Specifically a universal customization manifest is sent to all UEs, irrespective of model of UE, that are engaged in the customization process, for example during an activation of the UE. The same universal customization manifest comprises the information used by a first UE of a first model and first brand to customize itself as well as the information used by a second UE of a second model and second brand to customize itself. In some cases, the first UE and the second UE may have different operating systems installed and yet be able to self-customize themselves with the same universal customization manifest.

The creation of a single customization framework using a universal customization manifest can provide the benefit of a more easily maintained and updated customization system. That is, information technology (IT) staff do not need to learn and master a number of different customization systems and methods, for example different customization systems and methods for different operating systems or different models of UEs. Additionally, the single customization framework using a universal customization manifest provides support for a true single SKU UE inventory for a wireless communication service provider. In this forward-looking vision, a service provider would purchase a true generic UE device that is capable of customizing to support any feature set, any brand, and possibly even any operating system. Such a single SKU UE would provide many benefits to a service provider.

After being shipped by the OEM, the UE of the present disclosure may be brought into service through an activation process. As is understood by those of skill in the art, activation of a mobile phone or UE may comprise one or more steps of configuring or provisioning information into the wireless communication network infrastructure to support authentication of the UE into the wireless network to receive communication connectivity as well as one or more steps of configuring features and applications on the UE. Activation may proceed in a series of actions or steps.

During an early phase of activation, the UE may be provided with identity information such as a brand identity (recalling that this may be a quasi-generic UE that is customizable to any of a plurality of different brands) and carrier identifying information such as a mobile network code (MNC) or other. This identity information may be provided by insertion into the UE of a subscriber identity module (SIM) card or a universal integrated circuit card (UICC) that is provisioned with this information. This identity information may be electronically transmitted to the UE, for example over-the-air wirelessly or via a wired connection, and stored in a secure memory (similar to an embedded, non-removable SIM card or UICC) of the UE.

During activation, the UE may receive a universal customization manifest. In an embodiment, the manifest comprises a plurality of definitions of customization actions to be taken for a plurality of different UEs as well as customization logic, customization scripts, references, and/or configuration data that can be used by the UE to customize itself as mandated by the definitions of customization actions. A customization client application on the UE determines its group identity (GID) based on the information present in the SIM, UICC, or secure memory area. This GID can be an aggregation of UE model identity and brand identity. The GID can be an aggregation of UE model identity, carrier network identity, and brand identity. The GID can be an aggregation of other information as well. The customization client then searches the plurality of definitions of customization actions in the customization manifest using the GID it has determined as a search key. The customization client parses each set of customization definitions that are referenced by its GID. The customization client then performs the customization actions identified by the definitions, using the customization logic, customization scripts, references, configuration data, configuration scripts, and/or configuration logic also included in the customization manifest to perform those customization actions.

The universal customization framework taught herein replaces an earlier customization paradigm that may involve exchanges of multiple messages to complete the same customization, a process which may be sensitive to communication link interruptions. Said in other words, the universal customization framework reduces network traffic and reduces the vulnerability of the customization process to transient communications outages. Additionally, this framework delegates to the UE itself the decision making process of choosing, based on parsing and analyzing the universal customization manifest, the customizations for the subject UE, for example based on self-identification of the UE by reading its GID. This allows the server application that sends the customization manifest to the UE to be much simpler. The server application does not need to conduct a lengthy dialog with the UEs to complete customization; the server application does not need to incorporate complicated branching logic to provide for special cases related to different models of UEs and even different maintenance releases (MRs) of the same model of UEs. This framework may simplify and hence streamline and accelerate the process of deploying new UEs to the network—for example new models being deployed to customers. The network operator can publish specifications defining the customization framework and structure of the customization manifest and delegate to original equipment manufacturers of UEs both the development of customization overlays and customization supporting artifacts (customization logic, customization scripts, references to content sites, configuration data, configuration scripts, and/or configuration logic) and the testing of the same, thereby considerably reducing the labor burden on the wireless communication service provider of providing this service as in the prior customization paradigm.

Again, this framework redistributes much of the "intelligence" involved in determining what customization is to be performed on the UE from the network side to the device side—for example to a customization client application, thereby reducing the processing burden on the core network and making network operations (e.g., core computing functions) more efficient. One way of seeing this is to understand that powerful processors on the UEs will be recruited to perform the heavy lifting of analyzing and decision making rather than having the same processing performed for tens of millions of UEs through processing on servers in the core network. This innovation recruits tens of millions of UEs for performing this processing—which does not diminish or reduce the function of those UEs as those processors were not fully loaded in any case. This can result in considerable savings of capital equipment in reduced number of server computing resources needed to provide the desired customization processing.

In an embodiment, the definitions are different policies that define which of a plurality of feature customizations are to be performed for the UE having the subject GID. For some UEs a feature may not be customizable but instead may be hard coded and/or preconfigured in firmware by the OEM. For other UEs, by contrast, the same feature may be customizable during activation by the wireless service provider and possibly yet later by the customer. These differences—a feature is customizable on one UE model while the same feature is uncustomizable on a second UE model—can be defined in the policies, for example a feature customization policy overlay as discussed further hereinafter.

In an embodiment, the definitions are coded as a bit map of ones and zeros, each bit position associated with one feature customization. If a bit position holds a '1' value, the corresponding feature customization is to be performed (i.e., the corresponding UE feature is to be customized); if the bit position holds a '0' value, the corresponding feature customization is NOT to be performed (i.e., the corresponding UE feature is NOT to be customized). The bit map may be referred to as a feature customization policy overlay. By crafting the universal customization manifest, for example by an IT worker, the customization actions desired for each of a plurality of different GIDs can be defined and stored in the single universal customization manifest, along with all the different customization scripts, remote references (IP addresses, URLs, etc.), or data that allows each of the possible features to be enabled and/or activated on the UE. In an embodiment, the customization logic, customization scripts, references, and data may be provided in a compressed file container, for example in a ZIP file.

It is noted that the UE can be activated not only on the occasion of a first use when first delivered from an OEM. The UE can be reactivated on the occasion, for example, of migration of a subscription account from a first wireless communication service provider to a second wireless communication service provider. The UE can be reactivated on the occasion, for example, of migrating from a first brand associated with a carrier network to a second brand associated with the same carrier network. The same customization process described above can apply in these circumstances as well. It is contemplated that this customization framework can extend the concept of the GID to include additional identification information, for example maintenance release (MR) identities. Thus, a UE could undergo the customization process and apply a different customization overlay based on a changed GID resulting from an MR update of the UE.

In the circumstance that the UE is being reactivated or re-customized, user feature customizations may be present on the UE. 'User feature customizations' may affect some of the same features, settings, or configurations set during activation customization but may be performed by users and may be performed at times unrelated to activation, reactivation, rebranding, and changing of wireless service provider. Depending on the feature, the wireless service provider may consent to retaining the user feature customization for the feature on the UE but for other features may not retain the user feature customization but may instead replace the user feature customization with a preferred customization.

In an embodiment, the willingness to retain user feature customizations versus replace user feature customizations may be indicated in a user feature customization override overlay in the definitions of customization actions in the manifest, where the override overlay is referenced by the same GID that references the feature overlay. Each feature customization field of the feature customization policy is likewise represented in the feature customization override overlay. In an embodiment, the feature customization override overlay is a bit map such that each bit position of the feature customization override overlay relates to the same customization feature associated with the corresponding bit position in the feature customization policy. In an embodiment, the feature customization policy overlay associated with the GID is analyzed to determine feature customizations to perform. Then the user feature customization override overlay associated with the GID is analyzed to determine whether user feature customizations are overridden for specific features (override being active means that a user feature customization for the subject feature will be overridden and the feature customization preferred by the carrier will be activated). If a feature customization is not overridden and the user has customized the subject feature, the user customization is left in place and the carrier customization of that feature is not applied. If a feature customization is not overridden but the user has not customized the subject feature, the customization client may then activate or install the feature customization preferred by the carrier. The customization client may determine if a user customization has been provided by making a call to an operating system of the UE or by itself providing a monitoring function to track and log such user customization actions.

In an embodiment, the definitions of customization actions may further comprise a plurality of feature configuration overlays. Generally speaking, these feature configuration overlays can be used to define which of two or more alternative configurations is to be established for a corresponding customization feature. For example, for a customization feature that controls whether or not a specific messaging application is to be enabled or disabled for use on the UE, the feature customization policy overlay selected by the GID of the UE may indicate the messaging application is to be enabled but not indicate which of a plurality of different message length restrictions is to be configured for the subject messaging application. One or more feature configuration overlays may be referenced by the same GID to provide this further configuration information. For example, a single feature configuration overlay may have a single bit position of a bit map associated to the subject messaging application feature and a '0' value may indicate a maximum message length of 200 characters while a '1' value may indicate a maximum message length of 300 characters. Alternatively, two feature configuration overlays may have two bit positions—one in each feature configuration overlay—that are associated to the subject messaging application feature. In this case, the feature configuration overlays can indicate which of four different maximum message lengths may be configured. For example a '00' value may correspond to a 150 character maximum message length, a '01' value may correspond to a 200 character maximum message length, a '10' value may correspond to a 300 character maximum message length, and a '11' value may correspond to a 450 character maximum message length.

Different GIDs may reference different definitions of customization actions that comprise different numbers of feature configuration overlays. A first definition may have two feature configuration overlays, a second definition may have one feature configuration overlay, a third definition may have four feature configuration overlays. The significance of the encoding of the feature configuration overlays can be defined in the universal customization manifest, for example as part of configuration data. The encoding of the feature configuration overlays may select different operational modes of the corresponding features that are to be made active on the UE. The encoding of the feature configuration overlays, may in part map to different configuration scripts or configuration logic that are to be executed for customization of an associated feature. Configuring the feature may comprise executing the selected or mapped to configuration scripts and/or configuration logic.

For further details on a customization client, see U.S. patent application Ser. No. 15/265,833, filed Sep. 14, 2016, entitled "System and Method of Mobile Phone Customization Based on Universal Manifest," by Jagannath Ghoshal, et al., which is incorporated herein by reference in its entirety.

Turning now to FIG. 1, a communication system 100 is described. In an embodiment, the system 100 comprises a user equipment (UE) 102 comprising a cellular radio transceiver 104, a customization client application 106, and a group identity (GID) 108. The GID 108 may be stored in a memory of the UE 102 and may have been provisioned into the UE 102 during an early stage of activation of the UE 102. Alternatively, the GID 108 may be stored in a removable memory such as a subscriber identity module (SIM) card, a universal integrated circuit card (UICC), or some other removable memory device and the removable memory may have been inserted into the UE 102 during or before activation of the UE 102. In an embodiment, the system 100 further comprises a cell site 110 such as an enhanced node B, a network 112, and a customization server 114 comprising a customization server application 116. The customization server 114 may be implemented as a computer system. Computer systems are described further hereinafter.

The network 112 may comprise one or more private networks, one or more public networks, and/or a combination thereof. The UE 102 may be a mobile phone, a smart phone, a personal digital assistant (PDA), a media player, a headset computer, a wearable computer, a laptop computer, a notebook computer, or a tablet computer. The cell site 110 may establish communication links with the UE 102 according to a wireless communication protocol such as one or more of a long term evolution (LTE), a code division multiple access (CDMA), a global system for mobile communication (GSM), and/or a worldwide interoperability for microwave access (WiMAX) wireless communication protocol. The cell site 110 may communicatively couple the UE 102 to the network 112 so the UE 102 may perform voice calls with other UEs 122 via other cell sites 120 or may perform data communication sessions with servers coupled to the network, for example with content servers (not shown).

The UE 102 may undergo a customization process at one or more different phases in a life cycle of the device, for example upon initial activation (when first brought into service after shipping by the OEM) or upon reactivation for use on a different carrier network or for use under a different brand. The customization client application 106 may request a customization manifest 118a from the customization server application 116 executing on the customization server 114. The customization manifest 118a may comprise feature customization policy definitions and customization inputs for a wide variety of different UEs, for example different models of UE, UEs having different operating systems, UEs associated with different wireless service provider brands, UEs having subscriptions with different wireless carrier networks. A workstation 124 may be used, for example by an information technology (IT) worker, to create and extend the customization manifest 118a. For example, as new models of UEs are conceived of and released, new feature customization policy definitions and customization inputs associated with these new models of UEs may be added to the customization manifest 118a.

The customization manifest 118a may be referred to as a universal customization manifest because the same manifest is intended to contain feature customization policies, user feature customization override information, feature configuration definitions, and customization inputs for a universal set of different models of UEs (with the possible exclusion of iOS operating system based UEs). It is understood that the term "universal customization manifest" does not mean the manifest does not change over time—as new models of UEs are conceived and deployed to the customer market—but that at any given time, the same manifest is used by an extensive variety of UE models.

Upon request by the UE 102, the customization server application 116 may send a copy of the customization manifest 118a to the UE 102 as customization manifest 118b. The UE 102 receives the customization manifest 118b wirelessly via the cellular radio transceiver 104 or alternatively via a short range radio transceiver (not shown) such as a WiFi transceiver, a Bluetooth® transceiver, or another short range radio transceiver. The only difference between the manifest 118a and the manifest 118b, at least at the time that the UE 102 receives the manifest 118b, is that manifest 118b is stored on the UE 102 and manifest 118a is stored on the server 114. The customization client application 106 then searches in the customization manifest 118b using the GID 108 stored in the UE 102 for relevant feature customization policies, user feature customization override information, and feature configuration definitions that it applies or configures on the UE 102, as discussed herein.

Figure 2A:
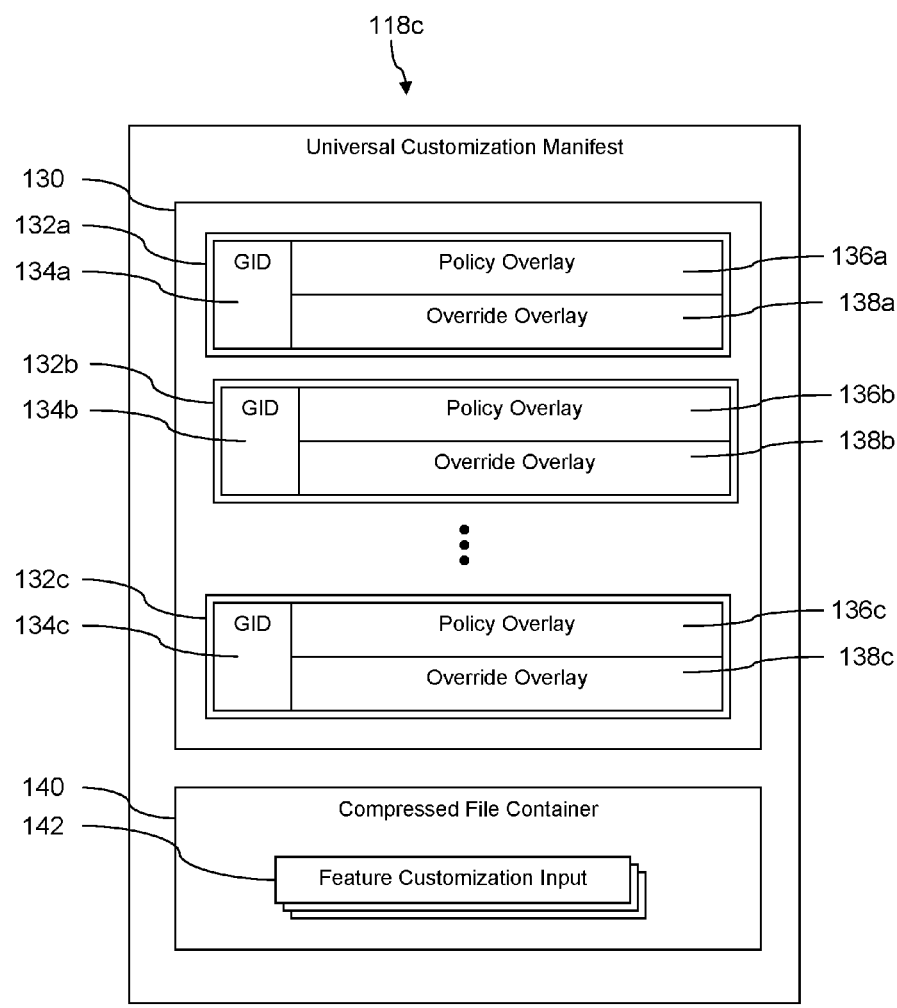
FIG. 2A is a block diagram of a universal customization manifest according to an embodiment of the disclosure.

Turning now to FIG. 2A, a third universal customization manifest 118c is described. In an embodiment, the third universal customization manifest 118c comprises a customization directives block 130 and a compressed file container 140. In an embodiment, the compressed file container 140 may be provided as a file separate from the third universal customization manifest 118c. In an embodiment, the third universal customization manifest 118c may be implemented as an extended markup language (XML) file or as a Java script object notation (JSON) file or in another format.

The customization directives block 130 comprises a plurality of customization directives 132. Each customization directive 132 comprises a group identity (GID) key 134 or reference and a feature customization policy overlay 136. In an embodiment, each customization directive 132 further comprises a user feature customization override overlay 138. Alternatively, some customization directives 132 may comprise a user feature customization override overlay 138 and other customization directives 132 may not comprise a user feature customization override overlay 138.

With reference again to FIG. 1, the customization client application 106 may use the GID 108 associated with the UE 102 to search in the universal customization manifest 118 for feature customization policy overlays 136 and optionally user feature customization override overlays 138. To search the universal customization manifest 118, the GID 108 is used by the customization client application 106 as a key or reference into the customization directives block 130. When a customization directive 132 having a GID key 134 that matches the GID 108 is found, the associated customization directive 132 is accessed and parsed by the customization client application 106. Based on the parsing of the customization directive 132, the customization client application 106 performs feature customization of the UE 102.

It can be the case that the aggregated identities in the GID 108 match to a plurality of GID keys 134. The GID keys 134 may comprise portions of the full GID 108. Recall that the GID 108 is an aggregate of multiple identities of the UE 102, for example one or more of a mobile network code (MNC), a brand identity, a maintenance release (MR) identity, and possibly other identity components. The MNC of the GID 108 may match a GID key 134 comprising only the MNC. Thus, the searching performed by the customization client application 106 can search the GID keys 134 using any portion of combination or portions of the aggregate identity represented by the GID 108.

Figure 2B:
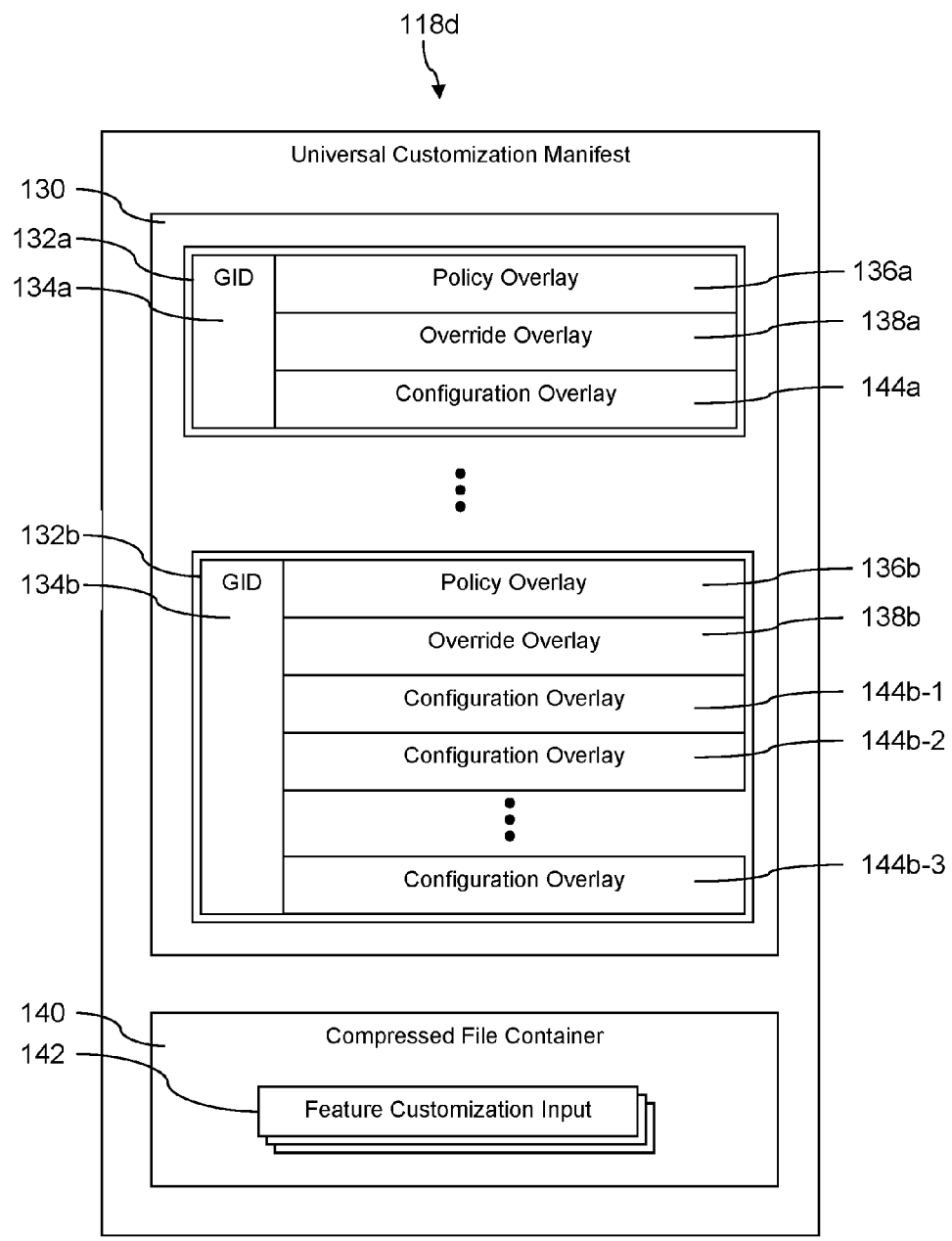
FIG. 2B is a block diagram of another universal customization manifest according to an embodiment of the disclosure.

Turning now to FIG. 2B, a fourth universal customization manifest 118d is described. Much of the fourth universal customization manifest 118d is similar to third universal customization manifest 118c, with the noted addition that the customization directives 132 in the fourth universal customization manifest 118d may further comprise one or more feature configuration overlays 144 in addition to the feature customization policy overlay 136 and the user feature customization override overlay 138. The first customization directive 132a of the fourth universal customization manifest 118d may comprise a first feature configuration overlay 144a and the second customization directive 132b of the fourth universal customization manifest 118c may comprise a second feature configuration overlay 144b-1, a third feature configuration overlay 144b-2, and a fourth feature configuration overlay 144b-3.

Some customization directives 132 of the second universal customization manifest 118B may not comprise feature configuration overlays 144 while other customization directives 132 of the fourth universal customization manifest 118d do comprise feature configuration overlays 144. The feature configuration overlays 144 may be used by the customization client application 106 to configure features that are indicated as enabled by the customization policy overlay 136, for example to configure a maximum number of characters of a particular messaging service that is enabled. It is noted that the feature configuration overlays 144, as part of customization directives 132, are also identified or referenced by an associated GID 134. The feature configuration overlays 144 may identify configuration scripts and/or configuration logic to execute to configure an associated feature of the UE 102. The feature configuration overlays 144 may identify operation modes of the associated feature or features on the UE 102.

Figure 3:
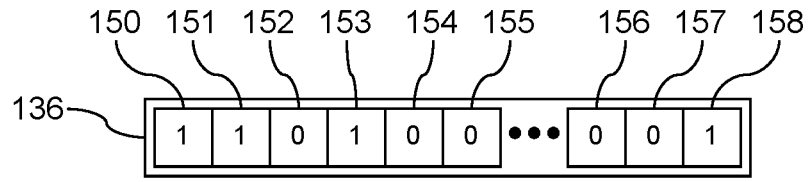
FIG. 3 is a block diagram of a feature customization policy overlay according to an embodiment of the disclosure.

Turning now to FIG. 3, an exemplary feature customization policy overlay 136 is described. The customization policy overlay 136 may be implemented as a bit mask or an array of bit positions. It will be appreciated that the present disclosure contemplates a plurality of different ways to articulate and/or encode feature customization policies and that the use of a bit map for encoding policy is only one of those different ways. The customization policy overlay 136 may comprise a plurality of bit positions, each bit position representing one of a predefined number of feature customizations. For example, the customization policy overlay 136 may comprise a first feature bit 150, a second feature bit 151, a third feature bit 152, a fourth feature bit 153, a fifth feature bit 154, a sixth feature bit 155, a seventh feature bit 156, a eighth feature bit 157, and an ninth feature bit 158. It is understood that the customization policy overlay 136 may comprise any number of feature bits. In an embodiment, the customization policy overlay 136 comprises about 49 feature bits. When a feature bit is set (i.e., has a value of '1'), the associated feature of the UE 102 is customizable (can be configured by the customization client application 106 versus is statically configured by the OEM or is not a supported feature). When a feature bit is clear (i.e., has a value of '0'), the associated feature of the UE 102 is not customizable.

In an embodiment, the feature customizations contemplated by the customization policy overlay 136 may be partitioned into feature customizations associated with voice mail customization, branding customization, messaging customization, browser customization, network parameters customization, contacts and dialers customization, and application management customization. In an embodiment, the feature customizations contemplated may be categorized differently. The voicemail customization category may comprise a voicemail speed dial feature customization. The branding customization category may comprise a branded startup animation feature customization, a branded startup sound feature customization, a branded shutdown animation feature customization, a branded shutdown sound feature customization, and a brand name feature customization. The messaging customization category may comprise feature customizations for IP address, port, URL, email signature, email synchronization schedule, and other feature customizations. The browser customization category may comprise feature customizations for homepage, bookmarks, search engine, and other feature customizations.

The network parameters customization category may comprise feature customizations for roaming menu, roaming preference, USB tetherings, Bluetooth® tetherings, and other feature customizations. The contacts and dialers customization category may comprise feature customizations for customer care contact, carrier contacts, dialer call intercepts, and other feature customizations. Other feature customizations may include customization of hardware diagnostics, customization of GPS. It is understood that the list of feature customizations in different embodiments may vary from that described above.

Figure 4:
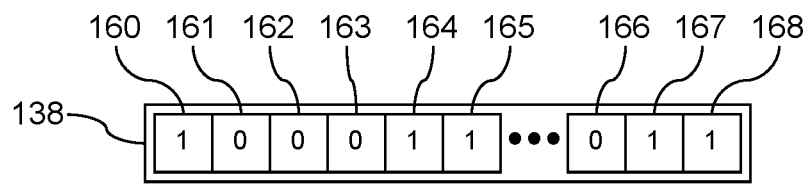
FIG. 4 is a block diagram of a user feature customization override overlay according to an embodiment of the disclosure.

Turning now to FIG. 4, an exemplary user feature customization override overlay 138 is described. In an embodiment, the user feature customization override overlay 138 may be implemented as a bit mask or an array of bit positions, but it is understood that other representations of the information contained in the user feature customization override overlay 138 are contemplated by the present disclosure. The number of bit positions in the user feature customization override overlay 138 conforms to the number of bit positions in the customization policy overlay 136. The user feature customization override overlay 138 may comprise a first feature override bit 160, a second feature override bit 161, a third feature override bit 162, a fourth feature override bit 163, a fifth feature override bit 164, a sixth feature override bit 165, a seventh feature override bit 166, an eighth feature override bit 167, and an ninth feature override bit 168. Each feature override bit position in the user feature customization override overlay 138 takes a value of '1' or of '0.' A value of '1' means that any user feature customization of the associated feature on the UE 102 will be overridden and customized in accordance with the customization action indicated by the corresponding bit position in the feature customization policy overlay 136. A value of '0' means that if a user feature customization of the associated feature is already present on the UE 102, the customization client 106 shall not change the user feature customization. On the other hand, if no user feature customization of the associated feature is present on the UE 102, the customization client 106 shall enact any customization action indicated by the corresponding bit position in the feature customization policy overlay 136. This may include, for example, changing a previous customization of the subject feature that was performed by the customization client 106 (e.g., something that was not customized by the user). The customization client 106 is able to query the user customization status of features of the UE 102 or to determine this itself.

Figure 5:
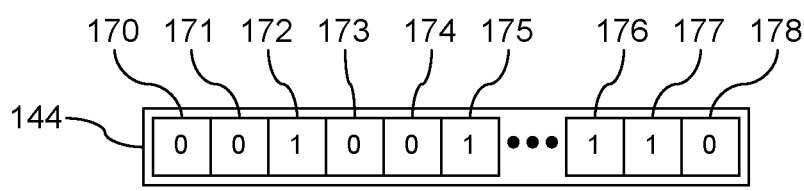
FIG. 5 is a block diagram of a feature configuration overlay according to an embodiment of the disclosure.

Turning now to FIG. 5, an exemplary feature configuration overlay 144 is described. In an embodiment, the feature configuration overlay 144 may be implemented as a bit mask or an array of bit positions. It is understood, however, that the feature configuration overlay 144 may be implemented in other forms than the form of a bit map. The number of bit positions in the feature configuration overlay 144 may be the same as the number of bit positions in the feature customization policy overlay 136. In an embodiment, the feature configuration overlay 144 may comprise 49 bit positions. The feature configuration overlay 144 may comprise a first feature configuration bit 170, a second feature configuration bit 171, a third feature configuration bit 172, a fourth feature configuration bit 173, a fifth feature configuration bit 174, a sixth feature configuration bit 175, a seventh feature configuration bit 176, an eighth feature configuration bit 177, and a ninth feature configuration bit 178. Each feature configuration bit position in the feature configuration overlay 144 takes a value of '1' or of '0.' The effects or meanings of the values in the bit positions is determined by the compressed file container 140 and/or feature customization inputs 142. Said in another way, the value in the feature configuration bits of the feature configuration overlay 144 maps into the compressed file container 140 and/or feature customization input 142 to identify a configuration to apply to the customization feature associated with the bit position or a script or other logic to execute to configure the customization feature associated with the bit position.

Figure 6:
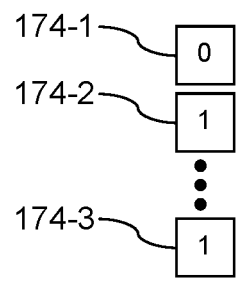
FIG. 6 is a block diagram of portions of a plurality of feature configuration overlays according to an embodiment of the disclosure.

Turning now to FIG. 6, a sequence of feature configuration bits from the same feature configuration bit position in different feature configuration overlays 144 that are part of the same customization directive 132 (hence reference by the same GID 134) is described. For example, a first bit 174-1 may correspond to the fifth feature configuration bit of the second feature configuration overlay 144b-1, a second bit 174-2 may correspond to the fifth feature configuration bit of the third feature configuration overlay 144b-2, and a third bit 174-3 may correspond to the fifth feature configuration bit of the fourth feature configuration overlay 144b-3. The same feature bits of different feature configuration overlays 144 associated to the same GID 134 can define a plurality of combinations that can be used to map into a list of alternative configurations to be applied to the subject customization feature. For example, the bits 174-1, 174-2, and 174-3 can map to eight different alternative configurations for the same customization feature. For example, these three bits associated with the subject feature can take on any of eight different values—000, 001, 010, 011, 100, 101, 110, and 111, each of which can map to a different configuration setting to apply to the subject customization feature or can map to a different customization script or logic to perform for the subject customization feature.

Figure 7A:
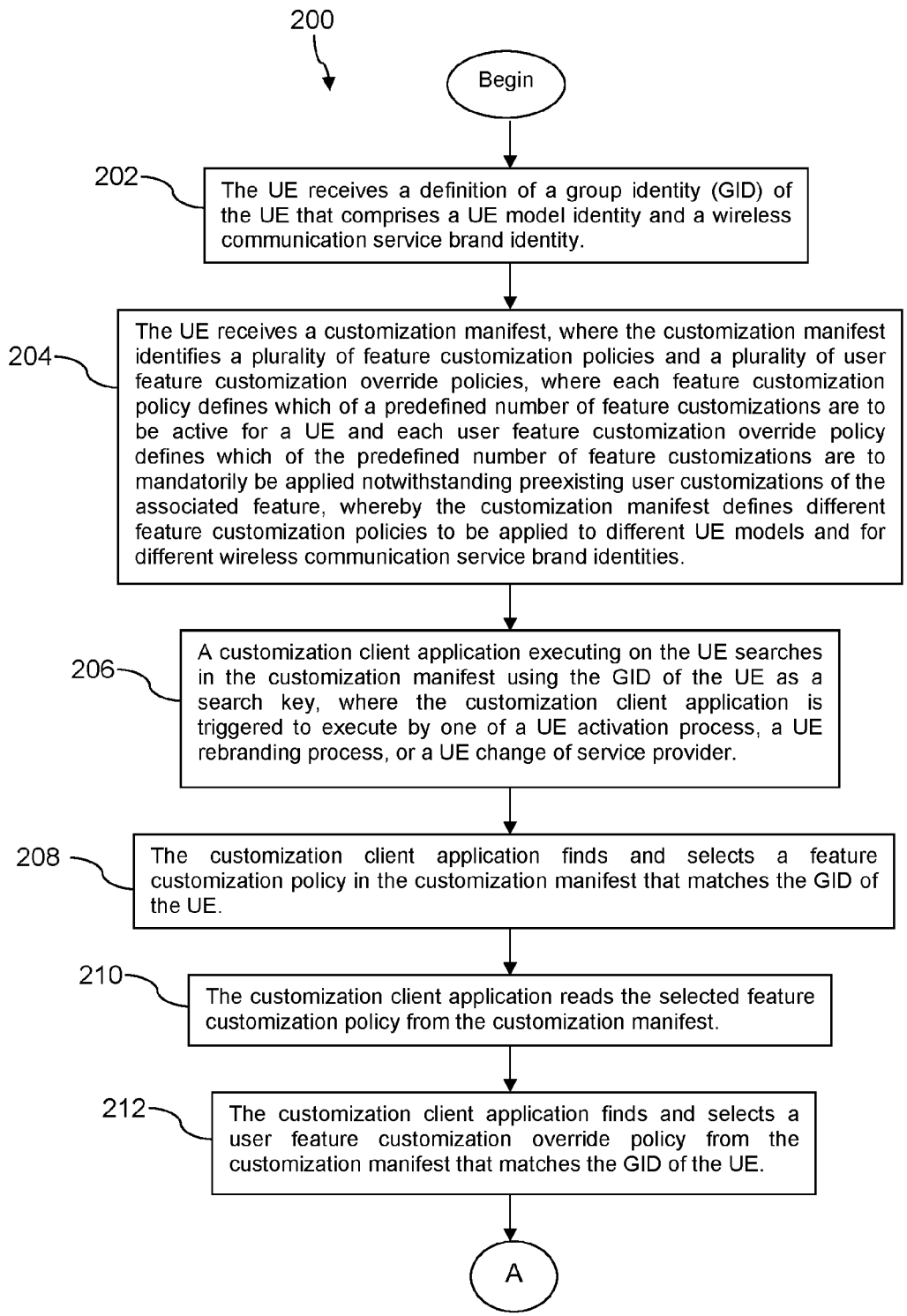
FIG. 7A and FIG. 7B is a flow chart of a method according to an embodiment of the disclosure.
Figure 7B:
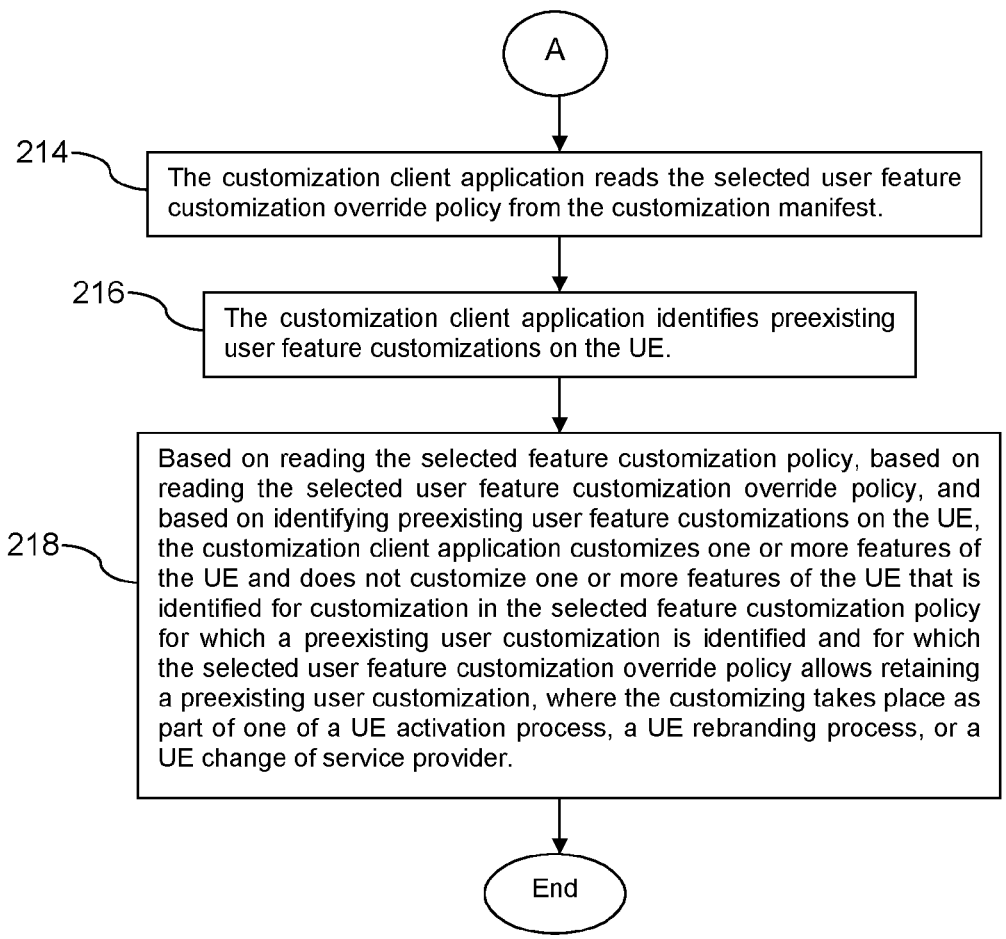

Turning now to FIG. 7A and FIG. 7B, a method 200 is described. It is understood that the processing below need not be performed in the order in which the processing is set forth. Additionally, it is understood that some of the processing may be repeated two, three, or more times during the performance of the method 200. At block 202, the UE receives a definition of a group identity (GID) of the UE that comprises a UE model identity and a wireless communication service brand identity. This definition of the GID of the UE may be received via a cellular radio transceiver of the UE, for example from an activation server in a wireless communication service provider network. Alternatively, the GID of the UE may be provided by insertion of a removable memory device, for example by insertion of a subscriber identity module (SIM) or a universal integrated circuit card (UICC) that stores the GID. In an embodiment, the GID may comprise a variety of information. The GID may comprise one or more of a UE model identity, a wireless communication service brand identity, a mobile network code (MNC), a maintenance release (MR) identity, or other identity. In some contexts, the GID may be said to aggregate the different pieces of information or the different identities associated to the UE 102.

At block 204, the UE receives a customization manifest, where the customization manifest identifies a plurality of feature customization policies and a plurality of user feature customization override policies, where each feature customization policy defines which of a predefined number of feature customizations are to be active for a UE, and each user feature customization override policy defines which of the predefined number of feature customizations are to mandatorily be applied notwithstanding preexisting user customizations of the associated feature, whereby the customization manifest defines different feature customization policies to be applied to different UE models and for different wireless communication service brand identities and one of overrides or permits retaining preexisting user customizations of features. For example, the UE 102 receives the customization manifest 118.

The customization manifest received by the UE may correspond substantially with the customization manifest 118 described with reference to FIG. 2A, FIG. 2B, FIG. 3, FIG. 4, FIG. 5, and/or FIG. 6. The feature customization policy overlay of the customization manifest may be a bit map as described with reference to FIG. 3. Alternatively, the feature customization policy overlay may have a different representation or be defined in a different format. For example, the feature customization policy overlay may comprise a plurality of parameter fields, where each parameter field corresponds to a single feature customization. The parameter fields may take on two different values, for example "active" or "inactive." Alternatively the parameter fields may take on three or more different values, for example "active," "inactive," or "not applicable." The user feature customization override policy overlay of the customization manifest may be a bit map as described with reference to FIG. 4. Alternatively, the customization policy override policy overlay may have a different representation or be defined in a different format.

At block 206, a customization client application executing on the UE searches in the customization manifest using the GID of the UE as a search key. The customization client application is triggered to execute by one of a UE activation process, a UE rebranding process, or a UE change of service provider. For example, the customization client application 106 searches in the customization manifest using the GID or a portion of the GID. For example, the customization client application 106 may deem a match of any single component of multiple components of the GID as a search match. The customization client application 106 may deem a match of any combination of two or more components of the multiple components of the GID as a search match. At block 208, the customization client application finds and selects a feature customization policy in the customization manifest that matches the GID of the UE. In some embodiments, the processing of block 206 and block 208 may be combined as a single step. It is understood, however, that the processing of block 208 may be repeated more than one time. Said in other words, the search of block 206 may result in two or more matches to the GID or partial matches to the GID. At block 210, the customization client application reads the selected feature customization policy from the customization manifest.

At block 212, the customization client application finds and selects a user feature customization override policy from the customization manifest that matches the GID of the UE. In some embodiments, the processing of block 206 and block 212 may be combined in a single step. At block 214, the customization client application reads the selected user feature customization override policy from the customization manifest. At block 216, the customization client application identifies preexisting user feature customizations on the UE. For example, the customization client 106 executes an operating system call on the UE 102 to determine previous customizations that have been performed by a user of the UE 102. Such user customizations may be discriminated from both system customizations (i.e., maintenance release (MR) types of changes that may be mediated by an original equipment manufacturer (OEM) of the UE) and carrier customizations (i.e., customizations initiated on the UE by the wireless communication service provider or carrier) by the operating system.

At block 218, based on reading the selected feature customization policy, based on reading the selected user feature customization override policy, and based on identifying preexisting user feature customizations on the UE, the customization client customizes one or more features of the UE and does not customize one or more features of the UE that is identified for customization in the selected feature customization policy for which a preexisting user customization is identified and for which the selected user feature customization override policy allows retaining a preexisting user customization, where the customizing takes place as part of one of a UE activation process, a UE rebranding process, or a UE change of service provider.

The processing of block 218 may be repeated for each of a plurality of feature customization opportunities or positions of the customization policy overlay of the customization manifest 118. For example, the customization client 106 executing on the UE 102 may read the first feature customization bit 150 of the customization policy overlay 136, determine that the value is "1," and accordingly perform a customization of the feature associated with the first feature customization bit 150 on the UE 102, based on one or more of feature customization inputs 142 stored in the compressed file container 140. These feature customization inputs 142 comprise one or more of a corresponding customization logic, customization script, Internet protocol (IP) address, uniform resource locator (URL), and configuration data. This may, for example, involve customizing or configuring a voicemail speed dial number for the UE 102. Notwithstanding this description, if the first override bit 160 had a '0' value (in the example in FIG. 4 this value is '1'), and the processing of block 216 had found a corresponding preexisting user customization, the processing of block 218 would NOT perform the subject customization associated with the first feature customization bit 150.

Next, the customization client 106 may read the second feature customization bit 151 of the feature customization policy overlay 136, determine that the value is "1," and accordingly perform a customization of the feature associated with the second feature customization bit 151 on the UE 102 based on one or more of a corresponding customization logic, customization script, reference, and data stored in the compressed file container 140 of the customization manifest 118 (provided the second override bit 161 did not have a '0' value and/or a preexisting user customization did not exist). Next the customization client 106 may read the third feature customization bit 152 of the feature customization policy overlay 136, determine that the value is "0," and accordingly perform no customization of the feature associated with the third feature customization bit 152 on the UE 102. The customization client 106 may continue reading and customizing or not customizing the remainder of UE features based on the contents of the feature customization policy overlay 136 found at block 208 and based on the user feature customization override overlay 138 found at block 212.

After completion of the processing of block 212, the processing may return to repeat the processing of blocks 206, 208, 210, 212, 214, 216, 218. Said in other words, additional customization directives blocks 130 may be found in the searching of blocks 206 and 208 to at least partially match the GID 108 stored in the UE 102. These additional successful searches would result in repeating the processing of blocks 210, 212, 214, 216, 218. It is understood that at least some of the processing of the blocks in method 200 may be performed in different orders. For example, the processing of block 216 may be performed at any point before the processing of block 218, for example before the processing of block 202, before the processing of block 204, before the processing of block 206, or at other places. The processing of blocks 212 and 214 may be performed the processing of blocks 208 and 210. Yet other rearrangements of processing blocks may be feasible and desirable.

In an embodiment, the processing of each feature customization bit read from the feature customization policy overlay 136 of the selected customization directives block 130 may further be based on the value contained in a corresponding user feature customization override bit read from the associated user feature customization override overlay 138. If the corresponding override bit has a value of "1," the customization of the subject feature is performed if the associated feature customization bit. If, however, the corresponding override bit has a value of "0," the customization of the subject feature is performed if the associated feature customization bit is "1" and if there has been no user feature customization of the associated feature. If, in this case, there is a user feature customization of the associated feature, this user feature customization is retained.

It is understood that the method 200 may comprise other actions and/or other processing blocks not illustrated in FIG. 7A and FIG. 7B. For example, the method 200 may further comprise the customization client application 106 finding and selecting one or more feature configuration overlays that match the GID of the UE, reading the one or more feature configuration overlays from the customization manifest, and configuring one or more customization features on the UE accordingly.

Figure 8:
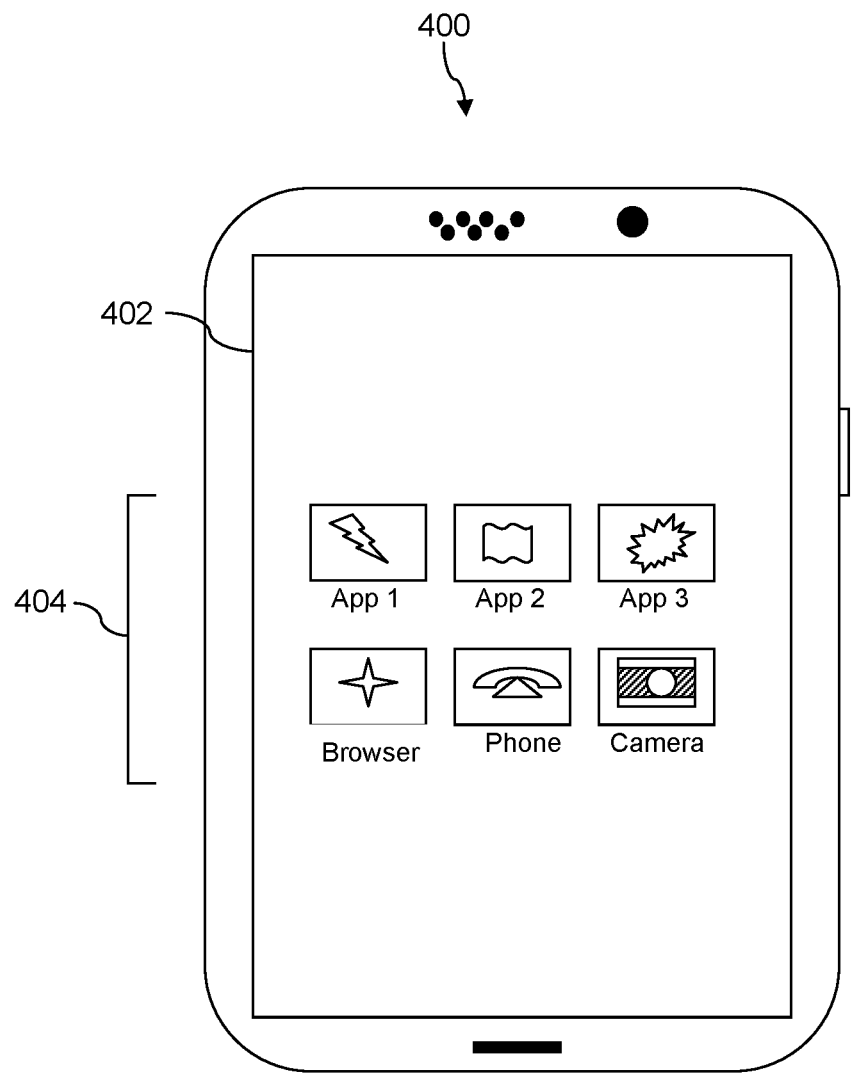
FIG. 8 is an illustration of a user equipment (UE) according to an embodiment of the disclosure.

FIG. 8 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 9:
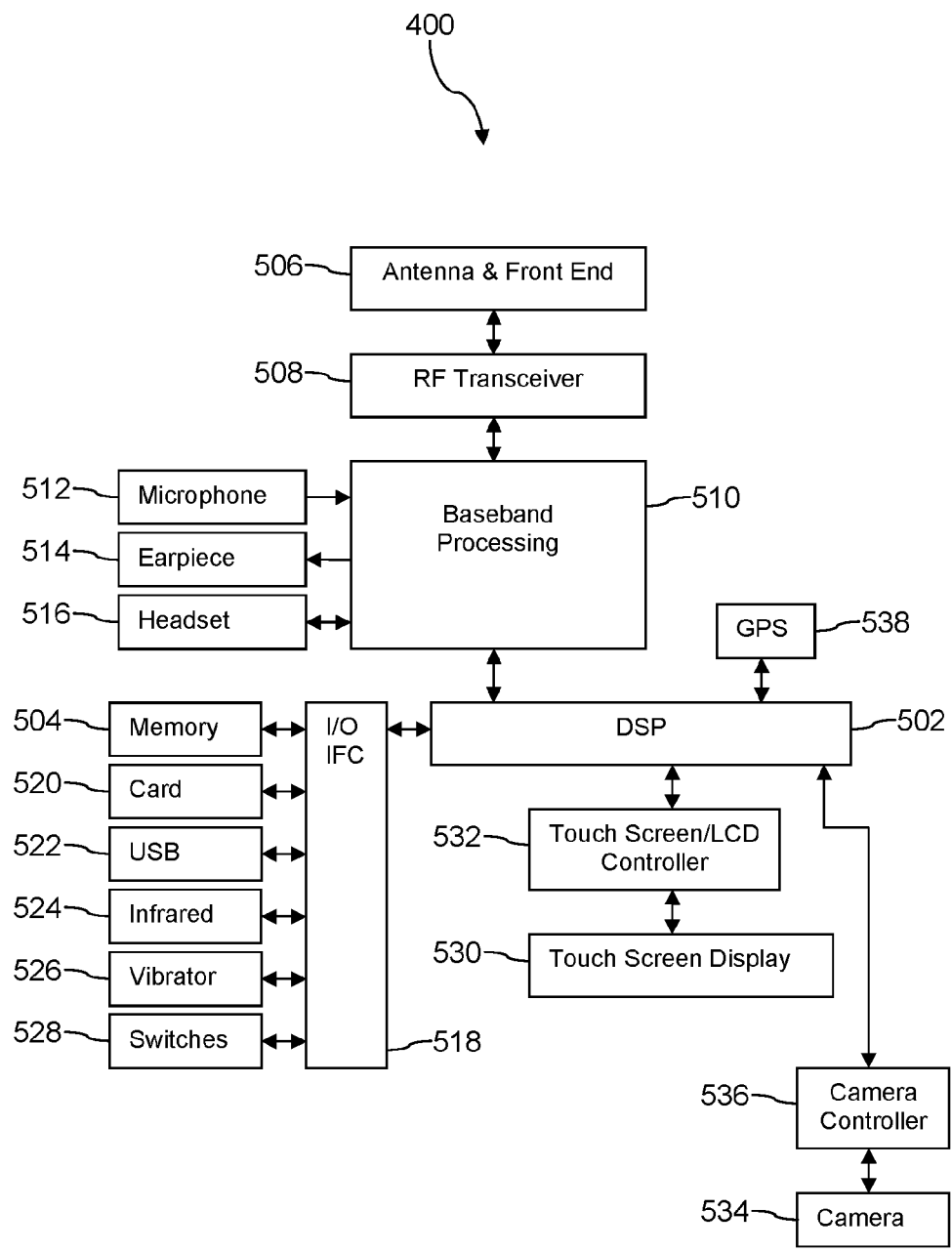
FIG. 9 is a block diagram of a hardware architecture of a UE according to an embodiment of the disclosure.

FIG. 9 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 10A:
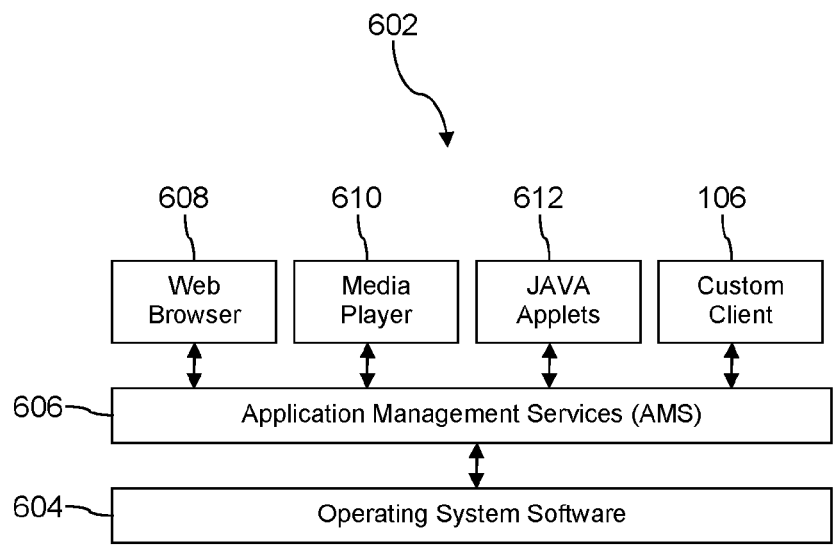
FIG. 10A is a block diagram of a software architecture of a UE according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 10A are a web browser application 608, a media player application 610, and JAVA applets 612. The customization client application 106 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
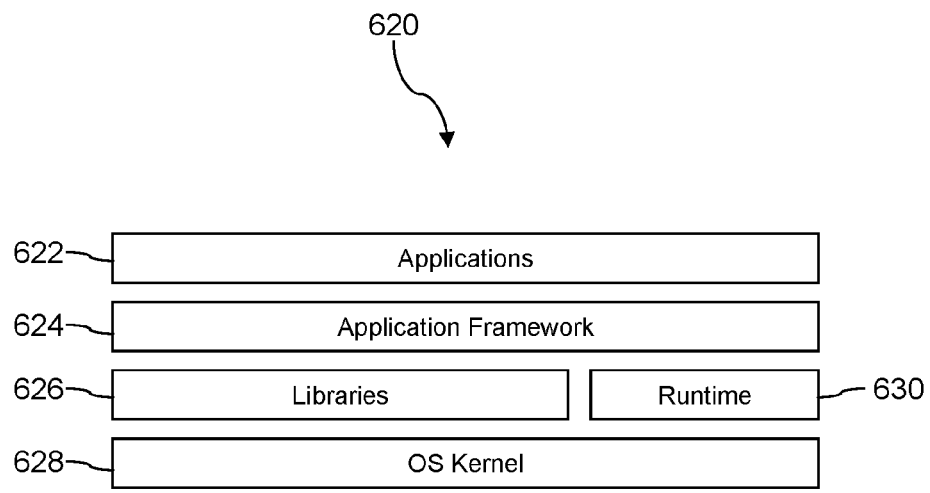
FIG. 10B is a block diagram of another software architecture of a UE according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
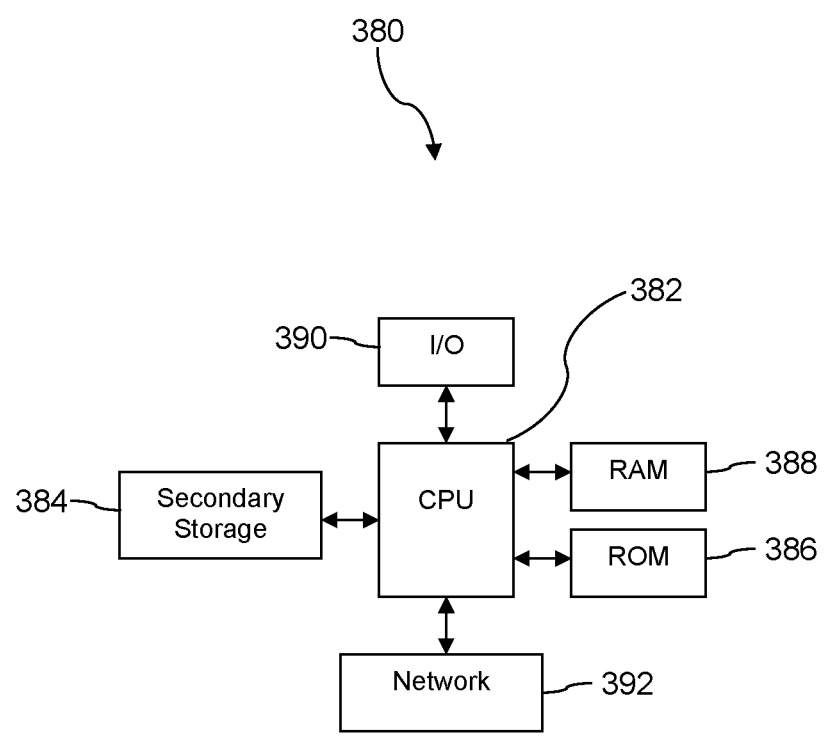
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of customizing a user equipment (UE), comprising:
   receiving by the UE a definition of a group identity (GID) of the UE that comprises a UE model identity and a wireless communication service brand identity;
   receiving by the UE a customization manifest, where the customization manifest identifies a plurality of feature customization policies and a plurality of user feature customization override policies, where each feature customization policy defines which of a predefined number of feature customizations are to be active for a UE, and each user feature customization override policy defines which of the predefined number of feature customizations are to mandatorily be applied notwithstanding preexisting user customizations of the associated feature, whereby the customization manifest defines different feature customization policies to be applied to different UE models and for different wireless communication service brand identities and one of overrides or permits retaining preexisting user customizations of features;

searching in the customization manifest by a customization client application executing on the UE using the GID of the UE as a search key, where the customization client application is triggered to execute by one of a UE activation process, a UE rebranding process, or a UE change of service provider;

finding and selecting a feature customization policy in the customization manifest that matches the GID of the UE by the customization client application;

reading the selected feature customization policy from the customization manifest by the customization client application;

finding and selecting a user feature customization override policy from the customization manifest that matches the GID of the UE by the customization client application;

reading the selected user feature customization override policy from the customization manifest by the customization client application;

identifying preexisting user feature customizations on the UE by the customization client application; and based on reading the selected feature customization policy, based on reading the selected user feature customization override policy, and based on identifying preexisting user feature customizations on the UE, customizing one or more features of the UE by the customization client application and not customizing one or more features of the UE that is identified for customization in the selected feature customization policy for which a preexisting user customization is identified and for which the selected user feature customization override policy allows retaining a preexisting user customization, where the customizing takes place as part of one of a UE activation process, a UE rebranding process, or a UE change of service provider.

2. The method of claim 1, wherein receiving a definition of a GID by the UE comprises receiving the GID by the UE via a radio transceiver of the UE.

3. The method of claim 1, wherein receiving the definition of the GID comprises inserting one of a subscriber identification module (SIM) or a universal integrated circuit card (UICC) into the UE, where the SIM or UICC stores the GID.

4. The method of claim 1, further comprising:
finding and selecting a feature configuration policy in the customization manifest that matches the GID of the UE by the customization client application;
reading the feature configuration policy from the customization manifest by the customization client application; and
based on reading the feature configuration policy, configuring one or more features of the UE by the customization client application.

5. The method of claim 1, wherein the UE is one of a mobile phone, a personal digital assistant (PDA), a media player, a headset computer, a wearable computer, a laptop computer, a tablet computer, or a notebook computer.

6. The method of claim 1, wherein searching in the customization manifest using the GID as a search key comprises using any of a component of the GID as the search key and a combination of two or more components of the GID as the search key.

7. A user equipment (UE), comprising:
a radio transceiver;
a processor;
a non-transitory memory; and
a customization client application stored in the non-transitory memory that, when executed by the processor:
determines a group identity (GID) of the UE during activation of the UE that comprises a UE model identity and a wireless communication service brand identity,
identifies preexisting user feature customizations on the UE,
reads a customization manifest received by the UE via the radio transceiver, wherein the customization manifest identifies a plurality of feature customization policies and a plurality of user feature customization override policies to be applied to different UE models and for different wireless communication service brand identities, where each feature customization policy defines which of a predefined number of feature customizations are to be active for a UE, and each user feature customization override policy defines which of the predefined number of feature customizations are to mandatorily be applied notwithstanding preexisting user customizations of the associated feature,
selects at least one of the plurality of feature customization policies from the customization manifest based on the GID of the UE,
selects a feature customization override policy from the customization manifest based on the GID of the UE, and
customizes the UE during one of activation of the UE, rebranding of the UE, or changing a provisioning of the UE to a different wireless communication service provider based on the selected at least one feature customization policies, the selected feature customization override policy, and based on identified preexisting user feature customizations on the UE, whereby wherein some of the predefined number of feature customizations are customized in accordance with the customization manifest and some of the predefined number of feature customizations are not customized leaving corresponding preexisting user customizations in place based on the selected feature customization override policy allowing retaining the user customization.

8. The user equipment of claim 7, wherein the GID further comprises an operating system identity.

9. The user equipment of claim 7, wherein the GID further comprises a mobile network code (MNC) identity.

10. The user equipment of claim 7, wherein the customization manifest further comprises a compressed file container comprising two or more of customization logic, customization scripts, customization Internet Protocol (IP) addresses, uniform resource locators (URLs), and configuration data and wherein the customization client application uncompresses the compressed file container and customizes the UE using at least some of the contents of the uncompressed file container.

11. The user equipment of claim 7, wherein the customization features are associated to voice mail customization, branding customization, messaging customization, browser customization, network parameters customization, contacts and dialer customization, and application management customization.

12. The user equipment of claim 7, wherein the customization client application reads the GID of the UE from a memory selected from one of a subscriber identification module (SIM) and a universal integrated circuit card (UICC) that is inserted into the UE prior to completion of activation of the UE.

13. The user equipment of claim 7, wherein the UE receives the GID via the radio transceiver during activation of the UE.

14. The user equipment of claim 7, wherein the customization manifest comprises feature customization policies that are irrelevant to the UE and are relevant to other UEs that have different GIDs.

15. A user equipment (UE), comprising:
a radio transceiver;
a processor;
a non-transitory memory; and
a customization client application stored in the non-transitory memory that, when executed by the processor in response to one of an activation of the UE, a rebranding of the UE, or a provisioning of the UE to a different service provider:
   determines a group identity (GID) of the UE that comprises a UE model identity and a wireless communication service brand identity,
   reads a customization manifest received by the UE via the radio transceiver, wherein the customization manifest comprises a plurality of feature customization policies, a plurality of user feature customization override policies, a plurality of feature configuration policies, and a compressed file comprising a plurality of feature customization inputs where each feature customization policy defines which of a predefined number of feature customizations are to be active for a UE, each user feature customization override policy defines which of the predefined number of feature customizations are to mandatorily be applied notwithstanding preexisting user customizations of the associated feature, each feature configuration policy defines which of optional feature configurations of the predefined number of feature customizations is to be configured on the UE, and the feature customization inputs of the compressed file support activation of feature customization on UEs,
   identifies preexisting user feature customizations on the UE,
   selects at least one of the plurality of feature customization policies from the customization manifest based on the GID of the UE,
   selects a user feature customization override policy from the customization manifest based on the GID of the UE,
   selects at least one of the plurality of feature configuration policies from the customization manifest based on the GID of the UE,
   uncompresses the file of feature customization inputs,
   customizes the UE by customizing at least one feature identified as active based on the uncompressed feature customization inputs,
   leaves at least one preexisting user feature customization in place for which the selected user feature customization override policy allows retaining the preexisting user feature customization, and
   configures at least one of the customization features identified as active based on the selected at least one of the feature configuration policies based on the uncompressed feature customization inputs.

16. The user equipment of claim 15, wherein each of the plurality of feature customization policies comprises a bit map comprising a plurality of bit positions, where each bit position associates to one customization feature, where a '1' value in a bit position indicates that the customization feature associated with that bit position is to be performed during customization of the UE, and where a '0' value in a bit position indicates that the customization feature associated with that bit position is NOT to be performed during customization of the UE.

17. The user equipment of claim 15, wherein the customization client application configures a customization feature identified as active by executing a configuration script based on the selected at least one of the feature configuration policies, where the configuration script is part of the uncompressed feature customization inputs.

18. The user equipment of claim 15, wherein the customization client application configures a messaging application message size based on the selected at least one of the feature configuration policies.

19. The user equipment of claim 15, wherein the customization client application configures different modes of operation of a customization feature of the UE based on the selected at least one of the feature configuration policies.

20. The user equipment of claim 15, wherein the customization client application selects a plurality of feature configuration policies based on the GID, wherein the corresponding feature bit positions of the feature configuration policies encode different binary combinations that map to different configuration data or different configuration scripts in the feature customization inputs.

* * * * *